Jan. 9, 1973 A. L. JAMES 3,709,775
PRODUCT COMPOSITIONS FOR MAGNETIC INDUCTION METHODS
TO TREAT AND HEAT-SEAL PREDETERMINED AREAS
OF PARENT UNITS
Filed Nov. 17, 1971 4 Sheets-Sheet 1
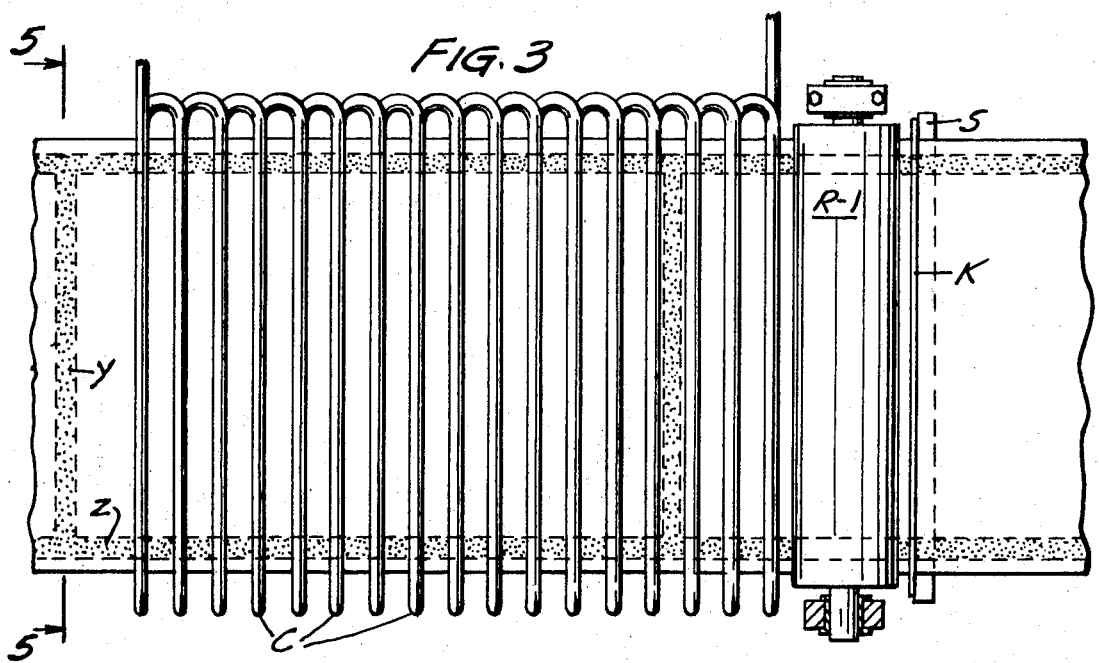
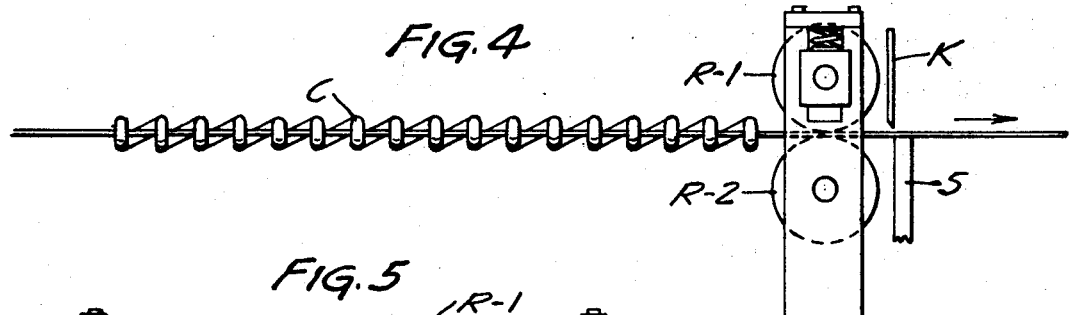
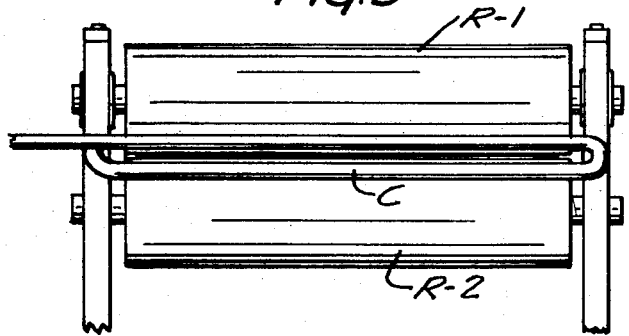
INVENTOR
ALBERT L. JAMES
BY Williamson, Palmaker + Brown
ATTORNEYS Jan. 9, 1973  A. L. JAMES  3,709,775
PRODUCT COMPOSITIONS FOR MAGNETIC INDUCTION METHODS
TO TREAT AND HEAT-SEAL PREDETERMINED AREAS
OF PARENT UNITS
Filed Nov. 17, 1971  4 Sheets-Sheet 2

INVENTOR
ALBERT L. JAMES
BY Williamson, Palmatier + Bains
ATTORNEYS

Jan. 9, 1973 A. L. JAMES 3,709,775
PRODUCT COMPOSITIONS FOR MAGNETIC INDUCTION METHODS
TO TREAT AND HEAT-SEAL PREDETERMINED AREAS
OF PARENT UNITS
Filed Nov. 17, 1971 4 Sheets-Sheet 3
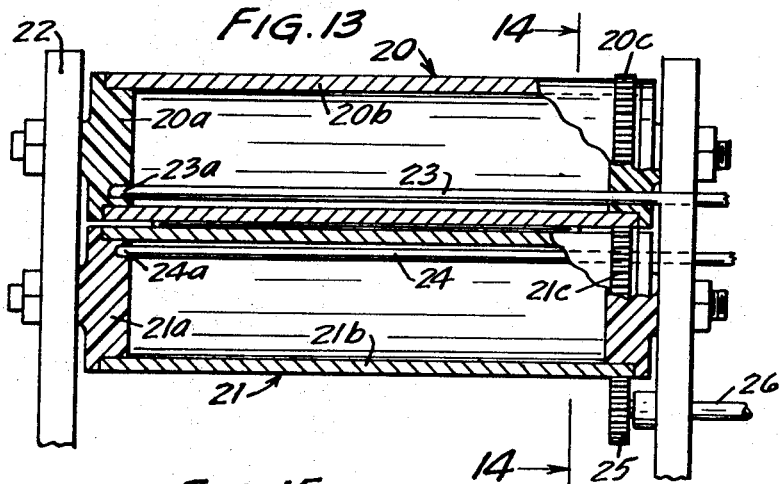
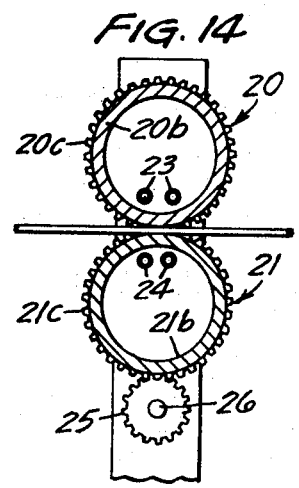
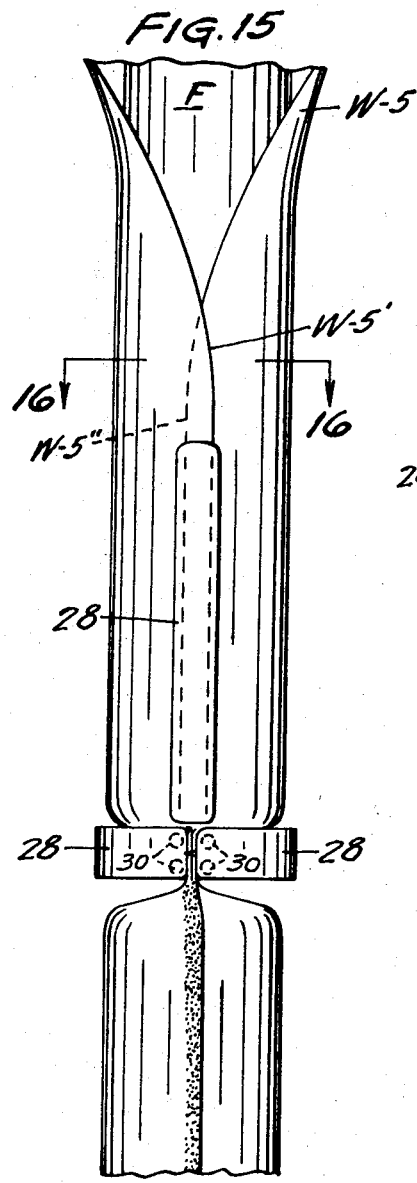
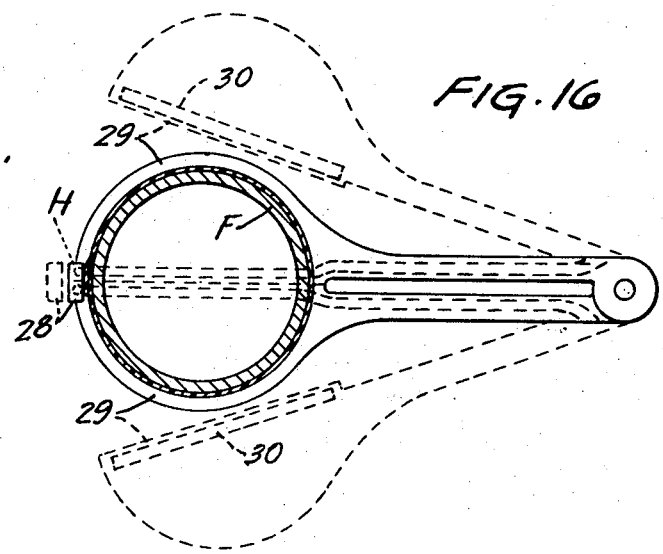
INVENTOR
ALBERT L. JAMES
BY Williamson, Palmatier & Baine
ATTORNEYS

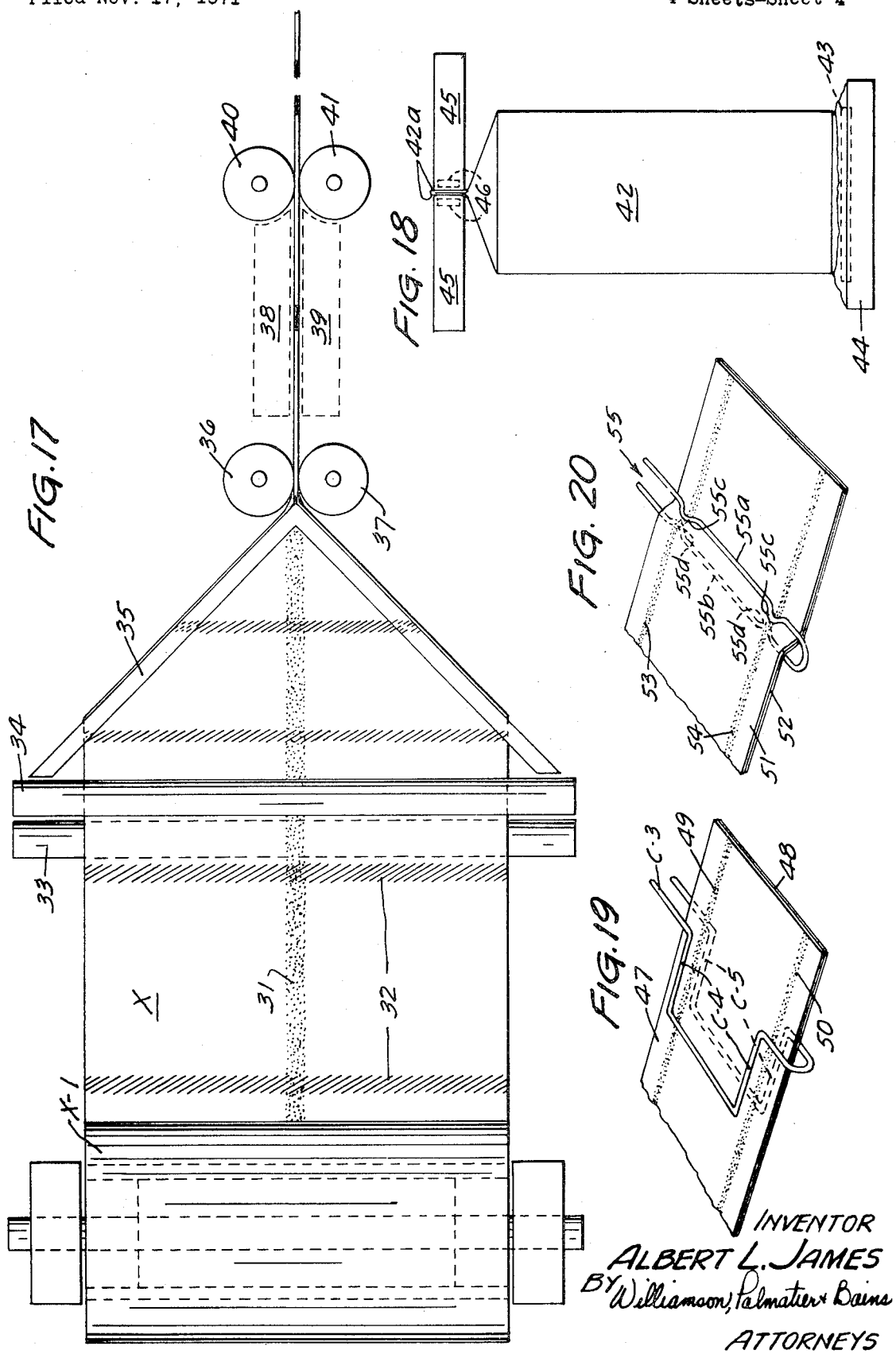

3,709,775
PRODUCT COMPOSITIONS FOR MAGNETIC INDUCTION METHODS TO TREAT AND HEAT-SEAL PREDETERMINED AREAS OF PARENT UNITS
Albert L. James, Hickory Corners, Mich., assignor of a fractional part interest to William C. Heller, Milwaukee, Wis.
Continuation-in-part of abandoned application Ser. No. 786,294, Dec. 23, 1968, which is a division of application Ser. No. 374,470, June 11, 1964, now Patent No. 3,461,014, dated Aug. 12, 1969. This application Nov. 17, 1971, Ser. No. 199,445
Int. Cl. B29c 27/04; C08f 45/04; C08k 1/02
U.S. Cl. 161—162                    9 Claims

ABSTRACT OF THE DISCLOSURE

Certain product compositions for association in or attachment to one or more parent units to produce treatment and heat sealing of predetermined areas of the parent member or members. The product compositions in all instances include a stratum of a heat-reactive plastic material which has substantially uniformly dispersed therein very fine susceptor particles selected from the chemical family of magnetic oxides. These particles are electrically non-conductive and are preferably employed in an average size range between sub-micron and 20 microns in longest dimensions, the said stratum, subjected to a suitable magnetic induction field, becoming rapidly heated to temperatures for heat processing the plastic material contiguous to the particles. In some instances the said stratum consists in a heat-fusible plastic surface or plastic unit with the susceptor particles dispersed rather densely and uniformly in said surface or unit. In other instances the stratum, with the susceptor particles embedded therein or carried thereby, is independently manufactured or produced and sandwiched between interfacing an opposed portions of a parent unit or sheet or sandwiched between two parent members or units.

CROSS REFERENCE TO RELATED APPLICATIONS

This application is a continuation-in-part application of my copending application Ser. No. 786,294, filed Dec. 23, 1968 and now abandoned, which application is a divisional application of application Ser. No. 374,470 filed June 11, 1964 now U.S. Pat. No. 3,461,014, issued Aug. 12, 1969 and entitled "A Magnetic Induction Method for Heat-Sealing and Bonding Predetermined Sealing Areas." This application relates to compositions and products of compositions disclosed in said original application.

FIELD OF THE INVENTION

This invention relates to materials for efficiently and economically heat-healing and bonding, at predetermined "seal" areas, two surfaces of sheets or webs by fusion of a thermoplastic medium, and wherein the heat for fusing the plastic material is obtained by high frequency induction heating with heat-producing media applied essentially only at the predetermined sealing areas of the two webs.

DESCRIPTION OF THE PRIOR ART

Thermoplastic materials have in the past, for the commercial production of packages, containers, pouches and the like, been heat-sealed to secure together narrow zones or sides thereof, most generally through apparatus of the "heated-bar" sealing type, wherein two jaws simultaneously apply even pressure and heat to the desired seal area. At least one of the jaws is electrically heated by conduction from rod, cartridge or other type electrical heating elements and is usually coated with Teflon or some other slippery agent to restrict sticking of film to the heat bar. The second jaw or bar (often referred to as "anvil" member) is usually covered with a heat-resistant material which is resilient and has release properties such as Teflon-covered silicon rubber or ordinary silicon rubber. Bar-heat sealing is for all practical purposes limited to an *intermittent motion* mechanism insofar as travel of the web or webs of the plastic-containing or coated flexible materials is concerned. Successful heat-sealing of this type and process involves three critical factors, to wit, critical temperature, proper pressure and proper "dwell" time. Said "dwell" time requires an intermittent motion or travel of the webs or sheet material.

Some apparatus and systems have utilized, through *intermittent* operation, the so-called "hot knife" principle of cutting and sealing simultaneously with the same hot knife. An example is a conventional "side weld" bag machine, where only the longitudinal edges of a folded or two-ply arrangement of thermoplastic is involved. The seals produced by the hot knife apparatus principle are not as durable as those obtained by the bar-type sealers.

Some progress has been attained for certain specific films or webs in continuously processing two webs of material to fuse desired narrow areas of thermoplastic material. These processes have ordinarily used heated shoes riding on one of the webs and after necessary "dwell" time of the riding action the two "activated" surfaces are almost immediately pressed together between pressure applying mechanical elements (usually driven). The apparatus for such processes have usually employed large wheels or drums for receiving and supporting the webs of the superimposed material. This procedure is entirely impractical for unsupported thermoplastic film such as polyethylene since at the sealing temperature the film is heated through the full tickness, it is not then self-supporting but on the contrary, is weak, sticky and will cling to any type of heat-sealing bar, wheel, etc., to the point where it will rupture. Said sealing procedures are therefore exceedingly difficult to manage and highly critical as to proper balance of tension, heat "dwell," temperature and pressure.

On an unsupported film or web the disadvantages and commercial unfeasibility stem chiefly from the fact that all present methods *cannot concentrate* the heat at *interface areas* or points where sealing and fusing of two superimposed web surfaces is desired. The heat applied has to pass *entirely through* the film, combination laminations or webs, to the seal areas of the interface surfaces, and the entire thickness of the laminations, film and webs reaches fusion temperature (and often above) before welding or fusion is effected.

Polyethylene and other widely used thermoplastics can achieve perfect sealing only when the temperature of the sealing areas is at the precise melting or fusion point. The film is no longer solid at that point but becomes a viscous liquid which will pull, draw, flow and stick to anything with which it contacts. It will readily rupture or cut through under slight sealing roll pressure. Thus, the serious disadvantages of heat-sealing unsupported film are as follows:

(1) Critical temperature control and "dwell" time is imperative;
(2) Frequent ruptures and cutting of plastic films occur at the seal areas;
(3) Substantial difficulties are present because of the stickiness of films to wheels, rolls or sealing bar; and
(4) To date, the foregoing described prior art methods are only reasonably successful where webs are moved usually intermittently at *slow speeds*.

The foregoing critical factors and objections are particularly applicable in the manufacture and production of packages, bags and containers where the webs are highly flexible. They are applicable in multi-laminations and in the heat-sealing of more rigid sheets. Again, it is stated that the great difficulty in such prior art processes is that all heat required to activate the sealing must be transmitted through the total *lamination*. Success of such method for sealing strong plastic coated substrate has been achieved principally through intermittent operation.

My improved system produces heating of the plastic surface or film at *only the predetermined seal areas* of the two or more webs. This is made possible by a well designed and chosen high frequency (usually categorized "radio" frequency) induction field, coupled with the distribution or application of very fine mesh metallic oxides in a predetermined pattern at the particular sealing areas or zones desired. By the application of such particles, when the induction heating coil is cooperatively designed as to power and frequency for the plastic and "susceptor" particles used. For the most part only the plastic on the surface to be heat-sealed is affected and almost simultaneously with heating and melting of plastic, *contingent* to the particles, contact of the surfaces to be sealed is effected. Thus, use of an adhesive is eliminated.

The prior art in the patent field, such as the patents to Kohler, No. 2,393,541; Pitman, No. Re. 22,301; and Ackerlind, No. 2,700,634 show uses of "magnetic particles" interspersed in a resin glue composition for the purpose of adhering other laminations such as solid rubber, leather, and various compositions, usually having rigidity in a *stationary operation,* where the magnetic particles are subjected to high frequency induction. In most instances of said prior patent art, the actual heating is by *dielectric* heating rather than by a true induction and the magnetic particles are either comminuted metal such as iron or comminuted metal alloys. The disclosures of such prior art are wholly unsuited to effectively heat-seal unsupported or moving webs of flexible sheet material. Furthermore, the disclosures of said patents, as to the size and identity of such magnetic particles and the power required, and the high frequency range as specified, make such processes and apparatus commercially impractical, if not impossible, for my intended uses in processing or production of bags, containers, milk carbons, pouches, film ampules and the like.

It is an object of my present invention to provide a novel and efficient induction heating system which has wide application to the heat-sealing and bonding of predetermined seal areas in many types, webs and laminations of sheet material and wherein one or more interface surfaces constitutes or has applied thereto a thermoplastic, which system overcomes the criticality, difficulties and limitation to intermittent or stationary operation of the patented prior art previously discussed, and opens the door to easily controlled, high speed commercial processes for the production of bags, food and milk cartons, containers, plastic liquid ampules and the like, utilizing as a source of heat, high frequency induction fields in the "radio" frequency range, in combination with a particular distribution (such as dot or stripe patterns) of very finely comminuted, discrete metallic compounds or the equivalent which are disposed upon one of the interface surfaces at the precise locations desired to be fused and heat sealed.

A more specific object is the provision of a system of the class described, adapted for very wide application to the production of many sheet products where fluid-tight seals are needed in sides or ends of the package, pouch or other container formed; and which with certain reasonable controls, may be carried out on commercial scale, as a continuous process or cycle in other operations, to perform the sealing or welding functions between two or more webs, with continuous travel or movement of said webs in the process.

Another object is the provision of a system of the class described wherein the heat control available is direct and is extremely rapid, since the heat generated is directly in the seal areas and is not limited by slow heating or cooling response of heated bars or other apparatus.

A further object and discovery is the use of metal oxides dispersed in a solvent and carrier applied to a web in a manner of printing ink, screen process or paint, either over a heat-sealable plastic surface or upon the interface surface of a substrate web or sheet to be sealed along areas with a superimposed plastic surface of another web. With such objects and discoveries, and proper design, power values and radio frequency of an induction heating unit, the precise desirable temperatures for melting or fusing a thermoplastic material such as a number of the polyolefins, vinyls, polyesters and many others, *can be assured* with heat produced at only the precise areas contingent to or within the plastic or other web where predetermined sealing is desired.

This application for patent relates particularly to the novel product-compositions and products fully disclosed in my original application Ser. No. 374,470, which made provision for a large number of composite materials and products all of which have carried or embedded in usually a thin stratum of fusible plastic material densely disposed and uniformly dispersed very fine susceptor particles selected from the chemical family of metal oxides in which heat can be generated by hysteresis loss when the compositions and products are placed in a magnetic induction field. Many valuable articles of manufacture and products may be economically produced as is clearly disclosed in my said original application.

The foregoing and other objects and advantages of my invention will more fully appear from the following description made in conjunction with the accompanying drawings wherein like reference characters refer to similar parts throughout the several views and in which:

FIG. 1 is a plan view on a greatly reduced scale showing the end of a web of paper, film or paper board wherein a sealing pattern of magnetic iron oxide ink has been imprinted upon one surface thereof and has been overcoated with a very thin coating of thermoplastic material such as polyethylene, polyvinylchloride and the like.

FIG. 2 is a cross section on a larger scale and with the thicknesses of the ink-oxide pattern and over-coating exaggerated, showing two of the webs of material of FIG. 1 in interfaced, contacting relation for inductive heat-sealing of the pattern-sealing areas;

Figure 6:
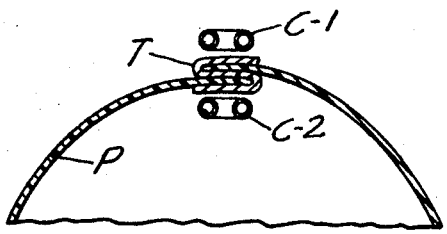
Figure 7:
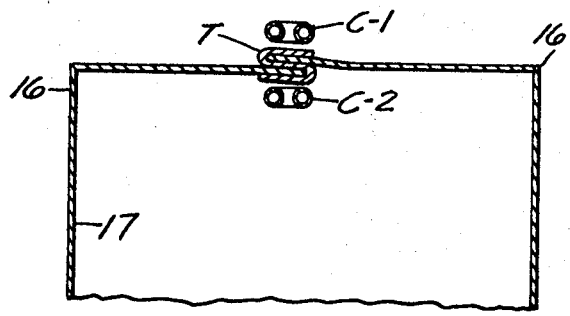
Figure 10:
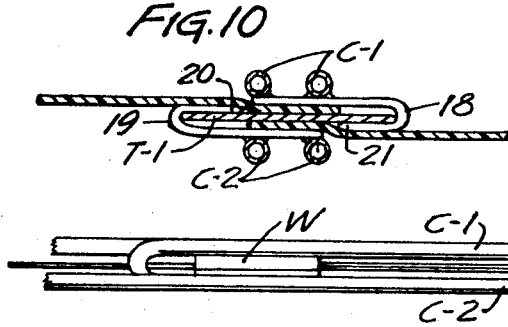
Figure 8:
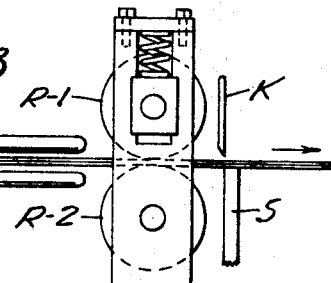
Figure 9:
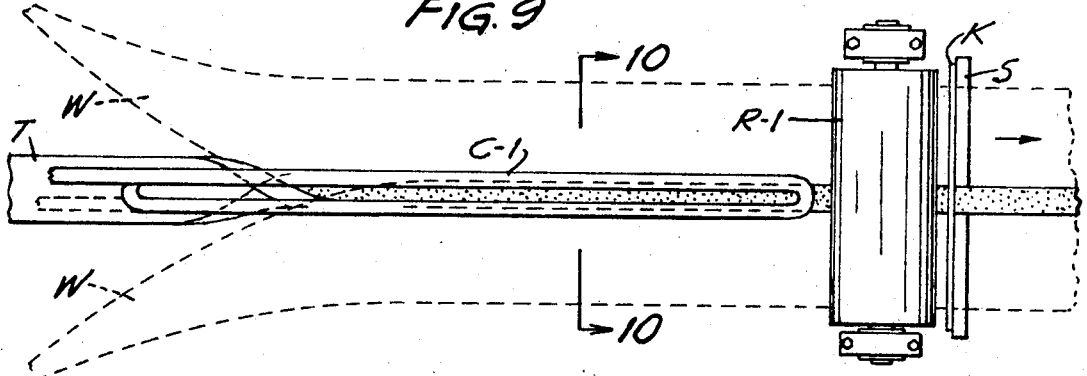
Figure 11:
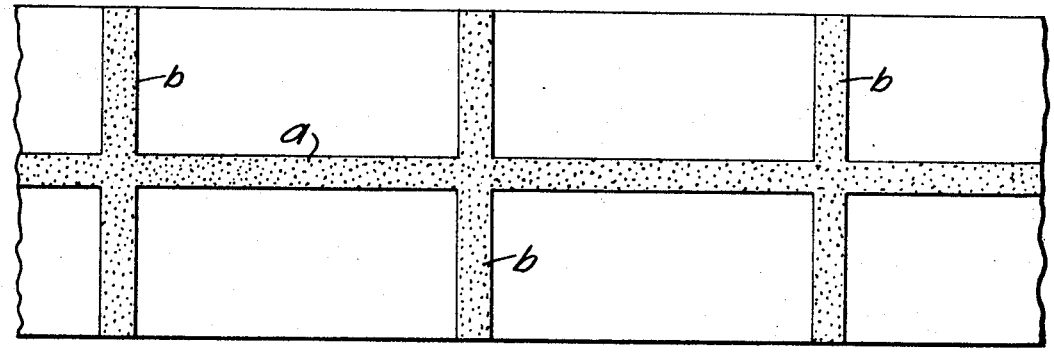
Figure 12:

FIG. 3 is a top plan view of one satisfactory type of apparatus for carrying out the general steps of an inductive heat-healing process in a continuous manner, where an electrical induction coil of the air-core type is employed, wound helically into flattened convolutions, with the elongated sides of the convolutions being only slightly spaced from the two webs of material which are to be heat-sealed, the webs being moved by pressure rollers disposed immediate to the rear end of the air-core coil;

FIG. 4 is a side elevation of the same;

FIG. 5 is an elevation with the heat-sealed webs shown in cross section, taken in advance of the pressure rollers along the line 5—5 of FIG. 3;

FIG. 6 is a cross sectional view showing my invention applied to the inductive heating step prior to the sealing of the longitudinal edges to form a tubular product, and wherein a special plastic tape infiltrated with the associated minute particles of the metal oxide is employed with folding and formation of said tape in an S-cross sectional shape;

FIG. 7 is a similar view wherein longitudinal edges of carton stock are joined and heat-sealed together;

FIG. 8 is a side elevation illustrating diagrammatically more of the apparatus employed in the pay-off, travel of the webs to be joined, and in the folding or forming of the special tape to heat-seal efficiently, the longitudinal edges of the two webs;

FIG. 9 is a top plan view of the apparatus and materials of FIG. 8, showing the disposition of the upper and lower tape-forming members and of the air-core terminals arranged to give adequate "dwell" time and terminating just short of compression rollers wherein the heat-sealing is completed;

FIG. 10 is a detail cross section taken in the manner of FIGS. 6 and 7 showing the guiding and positioning of longitudinal marginal portions of the web as well as the S-cross sectional shaping of the tape;

FIG. 11 is a plan view of a web of thin thermoplastic material such as polyolefin having imprinted thereon in both longitudinally extending narrow areas and spaced transverse areas, a predetermined pattern, and wherein said pattern may be imprinted in continuous manner upon the web or webs prior to the application of the induction heating step, and heat-sealing step;

FIG. 12 is a detail cross section showing interface portions of two pattern-provided webs (or portions of a folded web) prior to bringing said webs into contact for heat-sealing;

FIG. 13 is a cross section taken longitudinally through another form of my commercial apparatus, where two pressure rollers are provided for operating upon two or more webs of material and tensioning the same, and where air-core elements of the induction heating system are disposed eccentrically of and within the said rolls in closely spaced relation;

FIG. 14 is a cross section taken on the line 14—14 of FIG. 13;

FIG. 15 is a side elevation of apparatus for intermittently shaping a tubular formation and ultimate cylindrical package from a flat flexible web with provision for filling of said package during stages of its formation, and illustrating a phase of my invention applied thereto;

FIG. 16 is a cross section taken on the line 16—16 of FIG. 15, dotted lines indicating previous positioning of certain movable elements;

FIG. 17 is a diagrammatical plan view illustrating a simple and efficient apparatus for commercial, continuous manufacture of pouches from a flexible web;

FIG. 18 is a diagrammatical front elevation of a phase of my invention aplied to induction heat sealing of top and bottom portions of a plastic coated food carton; and FIGS. 19 and 20 are diagrammatical perspective views showing two applications of my invention in simple form with special design arrangements and functions of particular induction heating coils.

Generally stated, my novel system requires utilization of an intense electrical induction or magnetic field in a zone or zones very close to the two or more webs of sheet material which are to be heat-sealed or welded together along predetermined areas or lines. It usually requires the application of *predetermined patterns* of highly comminuted metal oxide powders upon a predetermined interface surface of the webs or plies to be sealed together. In the alternative a separate small stratum such as a "core" tape or filament may be interposed between the plies to be sealed together, such stratum being preferably composed of a thermoplastic carrier medium containing a multiplicity of very fine mesh metal oxide ingredients. My invention and discoveries include a number of different manners of application of said patterns of the material which becomes instantly heated when exposed to the desired intensive induction field. Preferably, the pattern is such that voids or interstices are left between dots, stripes or the like, upon one of the interface surfaces or contingent thereto, as by sandwich application of a tape or additional film. Provision of said voids and interstices permits the molten plastic immediately contiguous to the solid associated portions of the pattern to flow, covering the pattern to produce, when desired, a continuous, hermetically sealed weld, or if desired the pattern may be spotted in small areas spaced desired distances apart for spot welding or sealing.

My novel system is particularly important for commercial production in continuous operation of various containers.

The extensive experimental and developmental work which has been carried out in the reduction to practice of my invention has shown that heat-generating particles of exceedingly fine mesh are necessary for compatibility with passage and travel of thin plastic film. Such very fine particles require higher frequencies in the induction heating apparatus above 100,000 cycles per second, and preferably in megacycle frequencies. Magnetic cores are found to be totally unsatisfactory for carrying out the several forms of my invention; hence I have found that only coils of the air-core type are effective in my system. These coils are tubular and are cooled in operation by passage of a coolant such as water therethrough.

I have attained success under different and varying conditions by the use of an induction unit powered from 5 to 10 kilowatts and having frequency ranges between 4 and 31 megacycles.

Referring more specifically to the heat-generating particles utilized in my applied, predetermined stratum pattern or in auxiliary tapes or filaments to be fed sandwich-style between two webs or plies to be heat-sealed, I do not favor either fine particles, of metal such as iron, aluminum, copper, etc., or comminuted metal alloys.

I have found the use of metal oxides exhibiting the properties of ferromagnetism, particularly iron oxides, very satisfactory for my purposes and intent. Both the black and brown varieties of iron oxides are useful.

As noted above, these heat-generating particles are preferably of exceedingly fine mesh in size. In considering minimum particles sizes, the average particle size range may extend to .5 micron or even smaller, such as .01 micron or less. The lower end of the particle size range is thus submicron in nature and that term is used herein to characterize the exceedingly fine mesh particles typified by the above examples. The upper end of the average particle size range is typically 20 microns.

Numerous tests have been made employing a black magnetic iron oxide powder (ferric oxide) where the individual particles are acicular in shape. This material has a specific gravity of approximately 4.8 and an average length of particles somewhat exceeding ½ micron. Such particles do not, under normal conditions, agglomerate, but are discrete and may be readily admixed with conventional printing ink, solvents and carrier ingredients. Several of these tests produced the articles described in exemplary fashion below.

Referring now to the system illustrated in FIGS. 1 to 5 of the drawings, a typical web of paper or film is illustrated, having a predetermined, narrow pattern of my dissociated heat-generator particles applied to "sealing areas" thereof, and as shown, such areas including continuous longitudinal narrow zones z disposed adjacent the longitudinal marginal areas of the web with transverse, interconnecting narrow bands y disposed at widely spaced portions of the web. The patterns may be applied during travel of the two webs to be joined or rolls, sheets or die-cut blanks of the container stock may be preformed with said patterns thereon.

Over the imprinting of the zones z and y, and preferably covering the entire width of the web, a very thin coating of a thermoplastic material is applied, such as polyethylene, other polyolefins, and in some instances, vinyl.

As illustrated, two of such webs so prepared, are moved or payed out from rolls, with opposed interfaces by guiding, through an intensive electrical induction field, supplied as shown in FIGS. 3 and 4 by a flattened helical coil C of the air-core type. The two webs previously guided by idler rolls or the like, pass through the interior of the coil C, spaced in close relation thereto, and are engaged by squeeze rollers R-1 and R-2, one of which is urged into engagement with the intervening web by suitable resilient means.

In utilizing a coil of the air-core type, an air-core transformer may be employed to step up the voltage to the coil, or perhaps even a better approach is to connect the individual convolutions of the coil in parallel with one another. Thus, electrically a larger coil would be more practical for a lesser powered source.

In continuous travel through the air-core coil C the entire width of the moving webs are subjected to the radio frequency induction field, but since the board stock or other substrates and the thermoplastic coating are substantially dielectric (electrically non-conducting), only the patterned seal would be intensively heated. The length of the air-core coil of course determines the "dwell" time, as does of course, the speed of travel of the two webs to be heat-sealed.

Almost immediately after the patterned areas move outwardly from the coil and while the plastic material is in molten state in the patterned areas, the pressure rollers R-1 and R-2 bring the opposing or interface surfaces of the webs into contact with the pressure required and the efficient bonding or welding of the designated seal occurs. Immediately thereafter, if desired, a cutter knife K may be actuated to cut off individual containers, bags, pouches and the like, while the two webs continue to travel through the induction field and through the rollers.

What actually occurs in the welding and bonding of the plastic material, is of major importance and distinguishes the process from anything known in the prior art. Only the minute areas of plastic material surrounding or immediately contingent to the fine particles are heated, since heat is generated only in the particles per se. The temperature is such, with the control and proper values of the electrical energy, frequency range and "dwell" time through the intensive induction field, that the plastic melts and flows over the particles, completely bonding or welding with the narrow opposing seal areas. Thus, heat is applied only where the bond or weld is required and the full thickness of the polyethylene or other coating of film is not in molten state.

Referring now to FIGS. 6 to 10 inclusive of the accompanying drawings, cooperating parts or components of apparatus are illustrated, for carrying out certain of the important process steps of efficiently heat sealing elongated continuous edges of uncoated or coated paper, or board stock or the like.

In FIG. 6, a pair of elongated spaced air-core coils C-1 and C-2 are illustrated in cross section and are of the type illustrated in FIG. 8, being elongated to provide the essential "dwell" time in the travel of the webs to be heat sealed through the intensive induction field. An integral paper board web P has been shaped substantially cylindrical in cross section by a suitable cylindrical matrix or the like, with the two longitudinal edges and marginal portions thereof being slightly overlapped, and with interpositioning of a plastic tape T folded in continuous travel of the web P and tape T into a configuration of S-shaped cross section, with the top of the S so formed overlying the outer marginal edge of the outwardly disposed, longitudinal side of the web, while the base of the S configuration underlies the longitudinal marginal portion of the opposite longitudinal side of the web. Conventional guiding and folding apparatus of simple construction is available on the market for guiding and folding the tape T into this cooperative relationship shown in FIG. 6.

The tape T may be constructed from a composition of various thermoplastics such as polyethylene in which is embedded discrete, very fine particles of the highly comminuted chemical materials such as iron oxide which are quickly heated when subjected to an intensive high frequency inductive field. The particles are incorporated in quantities sufficient to heat the thermoplastic to fusion temperatures. The paper board or other organic web P need not be coated on either surface with thermoplastic material or it may be coated on one or both surfaces.

In any event, through the S-shaped configuration of the tape T it will be seen that the actual edges of the paper board or other web are covered by folds of the plastic tape material and in effect, a double heat sealing is attained because of the interposition of the intermediate strip of the tape between two marginal portions of the overlapped, longitudinal sides of the web.

FIGS. 8 and 9 diagrammatically illustrate apparatus for carrying out the induction heating step with the immediately following step of applying contact and pressure against the predetermined heat-sealing areas to bring about the juncture or weld along a narrow zone longitudinally of the web or webs and to provide for a continuous operation where such is desirable.

In FIG. 9, which is a plan view of such apparatus, the dotted lines having converging wings W indicate conventional folding and guiding mechanism for operation upon the tape T, and also simultaneous spacing of the marginal longitudinal edges of the web P to bring about the interrelation shown in cross section in FIG. 6. In FIGS. 8 and 9, the upper air-core C-1 extends longitudinally in a bend formation above the longitudinal heat sealing area. The lower air-core coil C-2 extends in parallel spaced relation to coil C-1 below the sealing area. Pressure rollers R-1 and R-2 substantially identical with those previously described with reference to the apparatus illustrated in FIGS. 3 to 5 are employed, which cooperate in the tensioning and moving of the web P and the folded tape T. The tape and the longitudinally overlapped portions of the web P may travel continuously through the intensive high frequency induction field produced between air-core coils C-1 and C-2, and immediately thereafter the sealing areas are brought into firm contact with application of pressure from the rolls R-1 and R-2. Thereafter a transverse knife K may, at predetermined time intervals, be depressed against a shearing block S to cut off web and tape.

The relationship of the length of the coils C-1 and C-2, taking into consideration the chemical particle make-up or composition of tape T and the travel speed of tape and web, is predetermined to give the most advantageous or optimum results. Thus, an important object of my invention is realized to the end that heating or fusing of only the thermoplastic portions of the tape immediately contingent to the particles is accomplished, with application of the heat only substantially in the predetermined sealing areas and without requirement of transmission of heat through the paper board or other organic substrate being utilized.

Some examples of actual composition of a desirable tape, length of opposed induction coils and speed of travel will be given herein.

In FIGS. 6, 7, 8 and 9 the sandwich core tape T is preformed in the shape of an S for the advantages previously herein set forth. FIG. 7 shows the application of the process including the heating of the particle-containing tape T, contoured into S shape, in the highly intensive inductive field between the air-core coils C-1 and C-2. In FIG. 7 paper board stock preformed into a rectangular box-like carton is shown, with scored edges 16 of the paper board or corrugated stock 17 being angularly bent and with the air-core coil C-2 disposed inwardly of the carton and necessarily supported from one end thereof at some wall or fixture independently of the support of the upper coil C-1.

In FIG. 10 the guiding and shaping of the tape T-1 as well as guiding of the longitudinal edges of the carton at intermediate turning are very diagrammatically illustrated. The receiving portions of folding and shaping elements 18 and 19 are also shown, made of insulating material.

In FIGS. 11 and 12 webs of thermoplastic flexible material F-1 and F-2 are shown, having predetermined patterns of fine mesh associated particles such as iron oxide applied thereto. In FIG. 11, the pattern includes a central longitudinal zone $a$, extending substantially the full length of the roll of the thermoplastic material and made up of dissociated or spaced dots or particles and narrow, transverse zones $b$.

In FIG. 12, two similar thermoplastic films F-1 and F-2 are shown with their opposing or interface surfaces being spaced in close relation. It will of course be understood that in this view of the drawings, as in others herein contained, the thicknesses are greatly exaggerated, as shown. The thermoplastic films F-1 and F-2 might have a thickness of even less than one-half mil (.001 inch). The zones $b$ of the induction heated chemical particles of the two films F-1 and F-2 are aligned transversely of the films as shown in FIG. 12.

In FIGS. 13 and 14 of the drawings, exemplary apparatus is illustrated for *simultaneously* carrying out and effecting the inductive heating step of the thermoplastic seal areas with the step of bringing *into contact and applying pressure* against the two or more overlapped webs or laminations to be, by heat seal, bonded or welded together at predetermined sealing areas. Such apparatus provides a medium for producing or cooperating in the production of uniform travel and tensioning of the webs or films.

As shown in FIGS. 13 and 14, pressure rollers indicated as entireties by the letters 20 and 21, are provided with means for driving the same in opposite directions. The rollers 20 and 21, as shown, have circular stationary ends affixed to a vertical or upstanding frame member 22 and provided with circular bosses 20a and 21a respectively, upon which tubular rolls 20b and 21b revolve, made of dielectric material not subject to induction heating.

Longitudinally disposed within each of the tubular rollers 20b and 21b are air-core coils 23 and 24 respectively, consisting in each instance in a narrow looped tubular coil, the inner or looped ends 23a and 24a of which are fixedly mounted in the stationary bosses 20a and 21a respectively of the rollers.

The other ends of the coils 23 and 24 extend through the open ends of the hollow rollers 20b and 21b and are connected properly with the induction heating unit.

As shown in FIGS. 13 and 14, the right hand ends of the pressure rollers 20 and 21 are externally provided with meshing gears 20c and 21c which effect driving of the two pressure rollers in opposite directions. The lower roller 21 is driven through its external gear 21c by meshed driving connection with a smaller gear 25 which is affixed to the end of a driving shaft 26.

From the foregoing description, it will be seen that the two air-core coils 23 and 24 are disposed eccentrically and in very close spaced relation relative to the general cross sectional shape of the compression rollers 20 and 21 and always are maintained in such predetermined closely spaced, parallel relationship. Thus when two or more webs of material to be heat-sealed at predetermined sealing areas are pressed together into contact between rollers 20 and 21, such webs in continuous movement, pass between the pressure rollers and also through the intensive high frequency electrical inductive field created between the coils 23 and 24. Thus, the predetermined sealing areas of two or more plies or webs between which patterns of the chemical particles are disposed are simultaneously and instantly heated by the intensive inductive field, while being subjected to pressure to force the laminations, plies or webs together.

In FIGS. 15 and 16, I disclose an application of my invention by the use of which thermoplastic tubular stock may be formed and sealed along overlapping longitudinal edges from a web of plastic film or the like, and substantially simultaneously filled with material, and thereafter formed into containers of cylindrical shape with timed heat-sealing and severance of filled containers formed.

Packaging machinery is available for sequentially forming a flat web of plastic film or the like into a tube and then intermittently filling lengths of that tube with material. An example of such machinery is that manufactured by Hayssen Manufacturing Co., of Sheboygan, Wis., known to the trade as the "Form and Fill, Compac" machine. The filling and forming portions of such a machine is diagrammatically shown in FIGS. 15 and 16, through the use of which a phase of my invention may be carried out. The machine includes an elongated, vertical forming and filling tube F (the upper filling end being broken away). This tube F is suitably supported at its upper end and is adapted in intermittent cycles to receive material to be packaged. A flat web W-5 of plastic film, plastic coated paper stock or the like, previous to its positioning as shown in FIG. 15, has been guided and turned about a corner to shape itself as shown. The longitudinal edges W-5' and W-5" have been brought into marginal lapped relation throughout a predetermined package length with a lower skirt (not shown) left below the end of the forming tube F. Movement and forming of the tube of plastic material is then intermittently stopped and the said dependent skirt is then closed and preferably sealed along a straight line to form a closure for the package.

Adapting my invention to such a machine, I provide an elongated pressure bar 28 which is positioned longitudinally just outwardly of the overlapped edges of web W-5, made of dielectric non-conductive material not affected by induction heat and carrying or having embedded therein an air-core type of induction heater coil H. The coil H may be in the form of an elongated loop with the ends or legs thereof suitably electrically connected by flexible conductors, with the induction unit. Pressure bar 28 is supported and moved from the dotted line position shown in FIG. 16 inwardly against the lapped longitudinal edges of the web W-5 by automatically or by manually controlled means (not shown).

At some point prior to the turning and shaping of the web W-5, its later interfacing, longitudinal margin portions have been imprinted or otherwise provided with a thin stratum or coating of a composition or ink containing my previously recited fine particles of metal oxide.

Thus, when the bar 28 with its induction coil H is moved inwardly against the lapped edges of the tubular sheet, heat is quickly applied at the interface, predetermined sealing areas and to the contiguous thermoplastic material only.

At the same time the bar 28 is operatively applied through swinging of a pair of jaws 29, the depending skirt of the then formed tubular film or sheet is collapsed along substantially a straight line, with pressure applied to the then formed interfacing edges. Each of the jaws 29 (made from dielectric, non-conductive material not affected by induction heating) carries an air-core type induction heating coil 30 shown in dotted lines in FIG. 16, the legs of which are suitably electrically connected with the induction heating unit (not shown). The plastic film or web W-5 has been previously imprinted or supplied with a transversely extending series of heat-generating particles extending in spaced relation across the appropriate surface thereof. Swinging of the two jaws 29 is preferably simultaneously timed and effected with the operating action of the sealing bar 28. Immediately after such operations, material in granular or other form is injected through the filler tube F into the package formed and the operation of forming and moving the film longitudinally downward, is continued. The cycle is successively repeated and between each cycle the filled and closed package is severed from the stock of web W-5.

In FIG. 17 a simple and highly efficient application of my invention is diagrammatically illustrated for the economical commercial manufacture of pouches from a thermoplastic film or a web of flexible sheet material, having a plastic coating. The web or film X, as shown in FIG. 17, has been previously imprinted with patterns of my heat-generating particles. One of said patterns 31 has been applied throughout substantially the full length of the sheet, longitudinally and centrally thereof, and as merely exemplary of one form of pattern, has the metal oxide particles in dissociated spaced dot formation. The second patterning of the heat generating particles, as shown in FIG. 17, consists in a multiplicity of widely spaced, predetermined stripes 32 of the heat generating particles with the particles arranged generally in diagonal stripes, leaving interstices of the thermoplastic material therebetween.

As shown, the web or film X is drawn or payed off from a roll X–1 mounted upon a suitable spool. The film or web X passes between guiding rollers 33 and 34 whereafter it engages and is guided by a conventional A-type stationary forming medium 35, thus being longitudinally folded and passing between the rollers 36 and 37 which have their axes disposed perpendicularly to the axes of guide rollers 33 and 34. The folded or doubled film or web X then in continuous movement, passes between induction heating coils 38 and 39, diagrammatically shown in dotted lines in FIG. 17, which coils extend transversely across the width of the doubled or folded web X, such coils being designed to give adequate "dwell" time for induction heating of the particles and thus the contiguous thermoplastic material during the continuous travel of the doubled web X. Immediately after the induction heating step, the doubled film passes through pressure rollers 40 and 41 which finalize the heat-sealing operation, and the previously heated, very thin areas of the thermoplastic, immediately contiguous to the heat-generating particles, rapidly cools, and the pouches formed may be readily severed.

In FIG. 18 a phase of my invention applicable to induction-heat-sealing of plastic coated food cartons such as milk cartons, is diagrammatically illustrated. Such a carton 42, previously folded along longitudinal lines and of rectangular cross section, is shown in vertical position with the upper ends of the several sides of the carton conventionally folded for sealing of two plies of the extremities of the stock, disposed vertically and flatwise. At its lower end the carton 42 has had end tabs thereof cross folded in conventional manner. The milk carton, diagrammatically shown as merely exemplary, is made from paper board stock coated on both sides with a thermoplastic such as polyethylene. The carton 42 or series of cartons, are moved by mechanism (not shown) horizontally over a smooth horizontal surface 43, constructed at least in the sealing area, of a material such as Teflon, which is a nonconductor of heat and electricity. In the horizontal movement of the upright containers a slight downward pressure is applied as by internal mandrels to bring the crossed, overlaying bottom tabs of the container into firm contact. A suitable air-core type induction coil 44 is mounted just below the surface 43 in very close spaced relation below the entire cross sectional area of the bottom of the cartons 42. Thus, inductive heating of heat-generating patterns previously applied to appropriate and predetermined areas of the carton stock, is effected in the horizontal movement of the cartons over the coil 44 with simultaneous application of pressure to cause fusing of thin portions of the thermoplastic material of the overlapped carton tabs immediately contiguous to the particles.

After filling of the carton the upstanding tabs of the plastic coated stock indicated as 42a in FIG. 18 pass between slightly converging edges of longitudinal bars 45 (the ends of which are shown) and are thereby inductively heat-sealed. The bars 45, for predetermined lengths at their converging ends, carry suitably designed air-core type induction coils 46 disposed in very close relation to the opposed edges of the bars. Sufficient pressure is applied by the convergence of the opposing sides of bars 45 to complete the sealing operation.

In FIGS. 19 and 20 two applications of my invention are illustrated in simple form, with special designs and arrangements of the induction heating coils (of air-core type). Examples of the specific heat-generating materials utilized and various thermoplastic and other webs employed in documented tests will be hereafter given.

Referring to FIG. 19, two webs or sheets of material 47 and 48 had previously interposed therebetween longitudinal patterns 49 and 50 of the fine mesh heat-generating particles. Here the brown iron oxide was employed in a carrier of thermoplastic material. The two patterns 49 and 50, as shown, extend parallel with the longitudinal edges of the webs 47 and 48 spaced a short distance inwardly thereof and extend the full length of said sheets. The air-core induction coil C–3 was specifically designed for this type of particle-pattern constituting in general an elongated loop with two sets of opposed angled legs C–4 and C–5 disposed on opposite sides of the two contacting webs 47 and 48, and in very close relation to the upper and lower surfaces of the combined laminations. The said two sets of legs C–4 and C–5 were vertically aligned with the patterns 49 and 50, causing the high intensity field generated to extend a predetermined distance along the travel of the patterns as the webs 47 and 48 are longitudinally moved in a continuous mannner. Thus, the "dwell" time of the particle pattern in the intensive magnetic field may be determined by relationship of the length of the two sets of legs C–4 and C–5 to the speed of continuous travel of the laminated webs 47 and 48. Very satisfactory heat sealing results have been obtained in welding and heat-sealing by induction with hysteresis for joining predetermined sealing areas of a number of different webs of material, including two thermoplastic films, two webs of paper, and paper to plastic laminations.

In the apparatus of FIG. 19 pressure was applied to the two webs of material immediately after the inductive heating step through the medium of rollers and the like.

In FIG. 20, another phase of my invention is diagrammatically illustrated where the apparatus employs another specially designed induction coil of air-core type, having as shown two sets of very closely spaced opposing coil portions for intensifying the induction or magnetic field therebetween, the legs of the coil being utilized in a continuous process to apply pressure to the laminated webs substantially simultaneously with the application of heat generation in two patterns of my said heat-generating particles.

In FIG. 20, two webs or sheets of material 51 and 52 are shown in superimposed relation, traveling through suitable pulling mechanism (not shown) in a continuous manner. Two patterns 53 and 54 of the fine mesh heat-generating particles were previously interposed between the interface surfaces of the two webs, either by imprinting the longitudinal patterns on one of said interface surfaces, or by feeding in, sandwich style, a narrow tape composed of a thermoplastic having embedded therein a substantial proportion of my preferred fine mesh particles such as brown iron oxide. The two webs 51 and 52 are brought into opposing relation and preferably contact, shortly before traveling in unison between the two legs 55a and 55b of the induction coil 55. Pulling apparatus such as the proper rollers (not shown) causes the laminations or webs 51 and 52 to travel in unison between the two legs of said induction coil 55. In the form of induction coil shown in FIG. 20, small opposing bends 55c and 55d are formed in the legs, said bends being smooth and slippery and the opposed interrelated bends being sufficiently close together so that friction with attendant pressure and tension is placed simultaneously upon the two webs.

Between the two sets of opposed bends 55c and 55d, the most intense induction or magnetic fields of the coil are set up and these are respectively aligned with the apparatus 53 and 54 of the brown iron oxide particles. Extensive tests on several different materials of webs and particles were made, as will be more specifically related in examples to follow herein, with very successful results in the induction heat sealing of the desired predetermined heat seal areas.

Before in detail reciting certain important examples of the efficient practice of my invention I will list in table form the materials utilized, including thermoplastic materials, heat-generating or "susceptor" particles and formulation of a particle-containing printing ink.

TABLE 1

Thermoplastic films and coatings

Polyethylene film—Conventional low-density 5-mil film (untreated). Softening point 230–240° F.; normal heat-sealing range 230–300° F.
Vinyl—Plasticized polyvinyl acetate 5.5-mil film. Softening point 200–250° F.; normal sealing range 200–350° F.
Polyester—Polyester terephthalate in form of Dupont's Mylar in films of 0.5, 2 and 5-mil thicknesses. Softening point about 300° F. (between 300–250° F.)

TABLE 2

Carriers for susceptor particles (tapes, coatings and ink)

DYNH—An extrusion-grade low density polyethylene manufactured by Bakelite Division of Union Carbide; average molecular weight 21,000, Spec. gravity 0.92. Softening point 230–240° F.; normal heat-seal range 230–300° F.
Gelva C5–V10—A polyvinyl acetate-crotonic acid copolymer supplied by Shawinigan Division of Monsanto. Softens at 253° F.
AYAF—A Bakelite polyvinyl acetate with a softening point of 171° F.

TABLE 3

Susceptors or heat-generating particles

| Material: | Average particle size |
|---|---|
| IRN–100 [1] | Average length 0.55 micron. Average width 0.08 micron. |

[1] Black magnetic iron oxide powder mixture. Supplied by C. K. Williams & Co., Easton, Pa. Specific gravity 4.8, acicular in shape.

EXAMPLE I

Two sheets of polyethylene film of the specification of Table 1 herein were patterned as shown in FIG. 20 of the drawings. A thin stratum approximating 5 mils in thickness containing the fine mesh black iron oxide susceptor particles was interposed between the two thermoplastic sheets in each of the two longitudinal patterns 53 and 54. In formulating the said strata about 60 parts by weight of the particles IRC–100 of Table 3 were used with about 100 parts of the carrier DYNH of Table 2.

The two films 51 and 52 so prepared were drawn through the specific form of induction heating coil (air-core type) shown in FIG. 20 with the cooperating opposed bends 55c and 55d of the coil being aligned with the respective patterns 53 and 54. Very effective juncture or welding of the entire predetermined sealing areas was obtained in continuous travel of the superimposed polyethylene sheets or webs. The power supply of the oscillator of the induction heating unit was approximately 10 kilowatts and the frequency was approximately 4 megacycles.

EXAMPLE 2

Juncture and sealing of dissimilar thermoplastic films

A polyethylene film, as specified in Table 1, and a vinyl film was specified in Table 1 were superimposed and in this case, the stratum applied containing the heat-generating particles was in the form of an independent narrow tape, constituting 100 parts by weight of IRN–100 of Table 3, mixed with 100 parts by weight of DYNH, of a thickness approximating 5 mils.

The said superimposed sheets with the narrow tapes interposed sandwich-like, were passed through the coil, as shown in FIG. 20 and at the appropriate speed within range, produced heat-sealing and a continuous bond between the predetermined seal areas.

The power supply of the oscillator of the induction heating unit was approximately 10 kilowatts and the frequency was approximately 4 megacycles.

EXAMPLE 3

Heat-sealing of two plies of cardboard

In this instance, a thin coating averaging about 2 mils in thickness, consisting in 400 parts by weight of AYAF resin (Table 2) and 300 parts of the IRN–100 was made in predetermined longitudinal areas of one of the interface surfaces of one cardboard sheet, applied by *doctor blade*. The overlaid webs of cardboard with the coating or stratum arranged as shown in FIG. 20 was passed through the specific type of induction coil shown in FIG. 20, and excellent heat-sealing and bonding together of the two cardboard sheets was obtained throughout the predetermined heat seal areas.

EXAMPLE 4

Formulation of ink carrier

It is an important feature of my invention that various printing inks may be prepared, containing the susceptor or heat-generating particles for application by various conventional printing processes to predetermined sealing areas of one or more sheets, films, substrates or coatings of the various materials which may be joined together and heat-sealed with my process. An example of a suitable ink which has been used by screen application in experimental work to produce the heat-sealing of my method comprises the following constituents with the indicated quantity by weight:

| Constituent: | Quantity by weight |
|---|---|
| Gelva C5–V10 | 100 |
| 28% ammonia | 6.7 |
| Water | 444 |
| Syton 200 [1] | 144 |
| IRN–100 | 150 |

[1] Syton 200 is a colloidal dispersion of silica ($SiO^2$) supplied by Monsanto. It would have a tendency to increase slightly the softening temperature of C5–V10 material (253° F.).

In some instances and experiments, a clear solution of the first four of the above listed ingredients was made. Application of a predetermined pattern upon sheets of polyethylene film, cardboard and polyvinyl acetate through a suitable fine mesh screen by first applying the IRN–100 powder dry to the screen and thereafter coating the said solution thereon. Heat-sealing of the screen pattern areas of the material was subsequently carried out in the type of induction coil illustrated in FIG. 20 with good success.

A thick mixture of the ingredients wherein the IRN–100 powder was added to the clear solution of the first four ingredients and thoroughly admixed therewith, was applied to polyethylene and cardboard sheets using a thin fine mesh screen with good end results in both instances.

*Examples of other* inks which include the fine mesh susceptor particles are as follows:

(a)

85 parts by weight IRN–100 or equivalent fine mesh powder; 15 parts binder such as shellac;
500 parts to 1000 parts ethyl alcohol;
Thickness of stratum formed from 1/10 to 1/5 mil.

(b)

85 parts by weight IRN–100 or equivalent oxide; 15 parts polyvinyl acetate emulsion;
300 to 500 parts water.

15

The above formulated inks (a) and (b) may be applied by rotogravure, flexographic or other printing processes to the thermoplastic films, coatings or to various substrates, paper, paper board, cellophane and other sheet material used with my process. Such inks of course require modifications in viscosity and treatment for the particular processes and type of stock being imprinted.

EXAMPLE 5

Advantages in sealing the thermoplastic materials having narrow heat-sealing ranges Polyester films such as Mylar by Dupont (Table 1) are known to have very narrow heat-sealing ranges. Experiments in the three thicknesses of Mylar specified in Table 1 (films of 0.5, 2 and 5-mils) were carried out in each instance, utilizing independent susceptor particle tapes constituting, as set forth in preceding Example 2, of a thickness between 4 and 5-mils.

The experiments on heat-sealing said Mylar to Mylar films were carried out with the use of the specific induction coil shown in FIG. 20 and with the two said independent tapes disposed sandwich-like as illustrated in the dotted patterns 53 and 54 of FIG. 20. The power of the induction heating unit was again approximately 10 kilowatts and the frequency approximately 4 megacycles in the several experiments made. The "dwell" time or speed of passing the superimposed, patterned Mylar sheets through the coil 55 was somewhat faster than in the examples herein given with reference to joining polyethylene films. Very satisfactory results were obtained in heat-sealing two sheets of each of said thicknesses heretofore specified. Portions of the sealed sheets in each of said experiments were broken open and the seal examined. It appeared that since the heat was generated at the interface of the Mylar films where the seal occurred, the Mylar apparently became liquid and flowed at the sealed area in such a manner to produce a Mylar-to-Mylar bond or weld surrounding the heat-seal tape member. This was accomplished in each instance without breaking or disrupting the Mylar sheet continuity.

EXAMPLE 6

Filament sealing—Special coil

A number of experiments were very successfully carried out for heat-sealing superimposed polyethylene films with the addition of independently constructed, narrow filaments or tapes containing the susceptor particles. In such experiments the type of induction heating coil illustrated in FIG. 19 was employed. The linear or longitudinal patterns 49 and 50 were obtained from preparation generally in the manner set forth in Examples 2 and 6 of very narrow filaments approximating 5-mils in thickness and 10-mils in width, from a composition of 200 parts by weight IRN–100, with 100 parts of DYNH (Table 2). The specially constructed induction coil as diagrammatically shown in FIG. 19 employed the two cooperating sets of colinear legs C–4 and C–5 spaced closely together approximately only 40-mils apart. The superimposed films of polyethylene 47 and 48 had sandwiched between them the two tapes in the dotted line positions and patterns 49 and 50, aligned linearly with the two sets of legs C–4 and C–5. The power input to the oscillator of the induction unit and the frequencies were 10 kilowatts and 4 megacycles respectively, throughout the several experiments. The superimposed polyethylene films with the filaments interposed therebetween were longitudinally drawn through the heating coil in the manner shown in FIG. 19 at speeds slightly exceeding 120 feet per minute. Continuous sealing along the predetermined sealing patterns and throughout the entire lengths of the filaments were obtained in each of these experiments, with a true welding or bonding of the actual thermoplastic material of the two sheets at the interfaces without break or disruption of the continuity of the polyethylene films.

16

ADDITIONAL IMPORTANT PHASES AND ADVANTAGES OF MY PROCESS (1) Mention has heretofore been made of the carrying out of my invention through the production and employment of an independently formed narrow strata of a composition containing the susceptor particles of very fine mesh, either in the form of a narrow tape or in the form of a cord or filament containing thermoplastic carrier ingredients. Some of the suitable carrier materials have been identified as exemplary for such purpose, as well as specific mention of the formation of the narrow tape.

In the production of filaments which will in effect give a "line seal," the cord or filament may be produced in somewhat the manner of production of monofilament plastic fishing line with the thermoplastic carrier material or materials having the susceptor metallic oxides or other finely divided particles (preferably below 10 microns in maximum average lineal dimensions) interspersed thereon. Filaments having major cross sectional dimensions of even less than 5-mils are deemed successful for the purposes of my invention.

(2) In the carrying out of my general technique, I note in passing the aspect of imprinting in various ways upon a sheet or movable ply of one of the materials to be heat-sealed, of predetermined susceptor patterns, or heat-generating patterns. This imprinting may be carried out as constituting the first steps or part of a continuous overall process or intermittent traveling process of bringing two webs, sheets or two plies of one web into opposing and then contacting relationship, subjecting the interface plies of the two sheets or webs to an intensive electrical induction field, and immediately thereafter, or simultaneously therewith, subjecting the webs to pressure to complete the weld or bond. Within the contemplation of this phase, sheets or webs of material may be, previous to the main steps, imprinted with not only the patterns of the heat-seal areas, but also inks of indicia for advertising, identification of product, label, etc., may be imprinted at substantially the same time.

(3) It will be understood that the principles of my invention are applicable to the bonding and inductive heat-sealing of two plies, webs, and films of a great variety of organic non-plastic materials, with the use of thermoplastic in coatings or strata or filaments between the materials, or as imprints upon at least one of the interface portions of the plies, webs, or sheets to be joined. In considering the class of plastic materials disposed contiguous to my patterns of susceptor particles, or incorporating such particles, various families of thermoplastic materials such as the vinyl family, the polyolefin family, the polyester family, the acrylics family, the polycarbonates, the polyamides, the cellulosics, the fluorocarbons, and the rubber hydrochlorides are useful in certain adaptations of my process.

Also, my invention is applicable to thermosetting plastics when applied during the interval of curing of such plastics and with joining of thermosetting plastics with various types of organic material such as paper, paper board, kraft, foil, cellophane and numerous other materials.

The term "thermoplastic" as used herein, and in the appended claims, broadly denotes the field of all thermoplastics, including waxes and mixed thermoplastics and thermosetting plastics, as well as thermosetting plastics when in the plastic state before final curing thereof.

(4) As a part of my overall discoveries and invention, the particular class and ranges of susceptor or heat-generating particles, with suitable carrier for very thin stratum or filament preparation of patterns, is important. From wide experimentation with metallic compounds, metal filings, fine metal particles and metal alloy particles, I have discovered that feasible commercial application of the process is accomplished with certain metal oxides, in comminuted powder form with average micron size ranges between submicron and 20 microns. Of the various metal oxides tested, the oxides of iron as indicated in Table 3 herein, appeared most advantageous for the particular designs of the induction coils and apparatus tested.

The metal and metal alloy particles require great concentration in relatively thick strata to produce even fair experimental results for inductively heat-sealing, and I have doubts as to the feasibility of their use in my process for commercial applications thereof.

(5) Another phase of my invention which will have importance in certain commercial use is an alternative step for causing ultimate interposition of the particles in predetermined sealing areas between the two webs or sheets to be joined and sealed by applicator-dispensing of the loose fine mesh particles upon a stationary or moving sheet and upon a surface of that sheet containing thermoplastic material, then retaining the loose particles on such sheet or moving web by electrostatic action wherein these particles are charged.

(6) Another phase of my invention well adapted for certain high speed commercial induction-type heat sealing consisting in subjecting the moving webs to be later joined and heat-sealed or at least a web containing a coating or constituting a film of thermoplastic material, to a preheating operation as by flame, infrared rays or suitable oven to preheat the thermoplastic to a temperature below its fusing temperature, immediately prior to subjecting the thermoplastic constituting the subsequent sealing medium to the intense induction field.

(7) Heretofore, the use of the coil itself for supplying tension and consequently sealing pressure, has been set forth. In this connection the use of a coil arranged with adjustable means between two legs or portions thereof, wherein the intensive field is set up, constitutes a part of my invention.

(8) My invention, carried out either with the coating or application of a stratum containing the susceptor particles interspersed in thermoplastic material or carried out by a sandwich-type method of interspersing a very thin, independent film or filament, has very important advantages not attained or approximated in the prior art for sealing together dissimilar materials, including two dissimilar plastic films or plastic coatings where the sealing ranges of fusion are quite different. The invention thus applied will seal and bond together many materials having fusion temperatures which vary within a wide range. The heat is only applied internally to the thermoplastic areas immediately contiguous to the susceptor particles and does not carry through the thickness of even thin plastic film.

(9) Another significant phase and advantage of my invention is in the heat-sealing or oriented materials such as Mylar, oriented polypropylene or the like.

Because of the novel steps utilized and the application of induced heat only at the very fragmentary contiguous areas of the films or plastic coatings, the heat does not penetrate through the webs or films so no destruction ensues in the oriented materials.

In the prior art, heat has been required through the film or oriented coating, thus destroying the original orientation of the material and seriously impairing the strength thereof.

It is recognized that while the heating steps are produced essentially through very high frequency electrical induction heating, that the effective and rapid heating of the susceptor particles is certainly brought about to at least a partial extent by hysteresis.

Definitions—(referring to terminology of the patent claims and the specification)

"Thermoplastic"—defined in column 17, lines 35 to 50.
"Susceptor Particles"—broadly any fine mesh particles which, when subjected to an intense electrical induction field, will become quickly heated.
"Plies"—two or more sheets, webs, films or folded or arranged portions of a single sheet, regardless of the flexibility, rigidity or lamination thereof.
"Fusion"—the term "fusion" as used herein means the softening of solid material such as thermoplastic by application of heat and to an extent where the material is in at least semi-liquid state.

My invention as clearly disclosed from the foregoing specification includes product compositions having great value and importance. In each instance a product composition is disclosed which essentially comprises a stratum of fusible plastic material which has substantially uniformly dispersed therein a great multiplicity of fine susceptor particles selected from the chemical family of metal oxides, said particles in an average size range between submicron and 20 microns in longest dimensions and are electrically non-conductive.

The many products and product compositions include the formation of the susceptor particle-containing stratum in an inherent plastic surface of a parent member or unit in many instances. In other instances the stratum may be separately and independently made as a tape or filament from a fusible plastic material and such tape or filament may be sandwiched between two substrate units or parent members, and of course one of said parent members may have an interfacing fusible plastic surface.

Various modes of carrying out the invention are contemplated as being within the scope of the following claims particularly pointing out and distinctly claiming the subject matter which is regarded as the invention.

I claim:

1. A solid thermoplastic synthetic material suitable for welding to a heat fusible body and comprising, a solid thermoplastic synthetic carrier having a temperature at which welding occurs, said carrier having uniformly dispersed therein fine particles with average micron size ranges between submicron and 20 microns selected from a class of metal oxides exhibiting the properties of ferromagnetism and being rapidly heatable upon subjection to a suitable magnetic induction field, said particles being incorporated in quantities sufficient to heat the carrier to welding temperatures.

2. The material as set forth in claim 1 wherein the fine particles have average micron size ranges between .5 micron to 20 microns.

3. The material as set forth in claim 1 wherein said fine particles are selected from a class consisting of gamma $Fe_2O_3$ and $Fe_3O_4$.

4. The material as set forth in claim 1 formed as a stratum for application to a surface of the heat fusible body.

5. An article comprised of a solid thermoplastic synthetic material forming a first fusible body welded to an adjacent surface to a second fusible body,
said first fusible body comprising a solid thermoplastic synthetic carrier having a temperature at which welding occurs and having uniformly dispersed therein fine particles with average micron size ranges between submicron and 20 microns selected from a class of metal oxides exhibiting the properties of ferromagnetism and being rapidly heatable upon subjection to a suitable magnetic induction field, and
said second body also comprising a solid thermoplastic material fusible to said carrier within the welding temperatures of the latter,
said particles being incorporated in said carrier in quantities sufficient to heat the carrier and the adjacent surface of said second body to welding temperatures for effecting a weld therebetween.

6. The material as set forth in claim 5 wherein the fine particles have average micron size ranges between .5 micron and 20 microns.

7. The article as set forth in claim 5 which further comprises a pair of second fusible bodies disposed in interfacing relationship, said first body being interposed between and welded to the adjacent surfaces of said pair of second bodies.

8. The article as set forth in claim 7 further characterized as comprising a packaging unit.

9. The article according to claim 5 wherein a predetermined area of the adjacent surface of one of said fusible bodies has dispersed therein said particles to constitute said thermoplastic material.

References Cited

UNITED STATES PATENTS

| | | | |
|---|---|---|---|
| 3,391,846 | 7/1968 | White | 156—273 |
| 2,393,541 | 1/1946 | Kohler | 156—272 |
| 2,916,399 | 12/1959 | Kurz | 156—275 |
| 2,087,480 | 7/1937 | Pitman | 156—273 |
| 2,622,053 | 12/1952 | Clowe et al. | 161—252 |

ROBERT F. BURNETT, Primary Examiner

G. W. MOXON II, Assistant Examiner

U.S. Cl. X.R.

156—272, 273, 275, 306; 161—146, 147, 168; 260—37 M